(12) United States Patent
Deng et al.

(10) Patent No.: US 12,487,292 B2
(45) Date of Patent: Dec. 2, 2025

(54) METHOD AND APPARATUS FOR CALCULATING CELL STATE, AND STORAGE MEDIUM

(71) Applicant: BYD COMPANY LIMITED, Shenzhen (CN)

(72) Inventors: Linwang Deng, Shenzhen (CN); Xiaoqian Li, Shenzhen (CN); Tianyu Feng, Shenzhen (CN); Sijia Liu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 440 days.

(21) Appl. No.: 18/080,168

(22) Filed: Dec. 13, 2022

(65) Prior Publication Data

US 2023/0112978 A1    Apr. 13, 2023

Related U.S. Application Data

(63) Continuation of application No. PCT/CN2021/102821, filed on Jun. 28, 2021.

(30) Foreign Application Priority Data

Jun. 30, 2020   (CN) ......................... 202010617231.2

(51) Int. Cl.
*G01R 31/392*  (2019.01)
*G01R 19/165*  (2006.01)
*G01R 31/367*  (2019.01)
*G01R 31/3835* (2019.01)

(52) U.S. Cl.
CPC ....... *G01R 31/392* (2019.01); *G01R 19/1659* (2013.01); *G01R 31/367* (2019.01); *G01R 31/3835* (2019.01)

(58) Field of Classification Search
CPC .............. G01R 31/392; G01R 19/1659; G01R 31/367; G01R 31/3835; G01R 31/3842;
(Continued)

(56) References Cited

U.S. PATENT DOCUMENTS 7,671,567 B2 *  3/2010  Eberhard ............... B60L 58/12
                                                    320/152
8,907,629 B2 * 12/2014  Kelty ................. H02J 7/007194
                                                    320/132
(Continued)

FOREIGN PATENT DOCUMENTS

CN          1934745 A      3/2007
CN        102590754 A      7/2012
(Continued)

OTHER PUBLICATIONS

The World Intellectual Property Organization (WIPO) International Search Report for PCT/CN2021/102821 Sep. 28, 2021 8 pages (with translation).
(Continued)

*Primary Examiner* — Tung S Lau
(74) *Attorney, Agent, or Firm* — Wenye Tan

(57)    ABSTRACT

A method for calculating a cell state includes: acquiring a first knee-point voltage threshold of a cell, a first knee-point electricity corresponding to the first knee-point voltage threshold, a second knee-point voltage threshold of the cell and a second knee-point electricity corresponding to the second knee-point voltage threshold; recording a first charging curve of the cell in real time; obtaining a target knee point according to the first charging curve, the first knee-point voltage threshold, and the second knee-point voltage threshold, and obtaining a target-knee-point electricity according to the first knee-point electricity or the second knee-point electricity; detecting the electricity of the cell until the charging is completed, and obtaining a charged
(Continued)

electricity of the cell from the target knee point to the completion of charging; and obtaining the capacity of the cell according to the target-knee-point electricity and the charged electricity.

20 Claims, 2 Drawing Sheets

(58) Field of Classification Search
CPC ............. G01R 31/388; G01R 31/3828; G01R 31/3648; G01R 19/12; G01R 19/30; G01R 31/382; G01R 31/385; G01R 31/396; Y02E 60/10
See application file for complete search history.

(56) References Cited

U.S. PATENT DOCUMENTS

| | | | |
|---|---|---|---|
| 9,649,944 B2 * | 5/2017 | Liu | ............................ H02J 7/14 |
| 2012/0176092 A1 | 7/2012 | Fujii et al. | |

FOREIGN PATENT DOCUMENTS

| | | | | |
|---|---|---|---|---|
| CN | 104931882 A | | 9/2015 | |
| CN | 106569143 A | | 4/2017 | |
| CN | 108008183 A | | 5/2018 | |
| CN | 108226783 A | | 6/2018 | |
| CN | 108469589 A | | 8/2018 | |
| CN | 110320477 A | | 10/2019 | |
| CN | 110549909 A | | 12/2019 | |
| JP | H06342044 A | | 12/1994 | |
| JP | 2012145403 A | | 8/2012 | |
| WO | WO 2005044610 A1 | * | 5/2005 | ............... B60K 6/48 |
| WO | 2020026058 A1 | | 2/2020 | |

OTHER PUBLICATIONS

Dong Liu et al., "Inflection point Ah-total integration method for real-time integration to correct lithium battery SOC", Energy Storage Science and Technology, vol. 8, No. 5, Sep. 2019.

* cited by examiner

| Select some of cells of the same specification, charge the cells at constant current to a fully charged state after the cells are fully discharged, and record a V-Q curve in the charging process as a second charging curve | S21 |

| Start to charge a cell with an unknown state, and record the V-Q curve in the charging process of the cell in real time | S22 |

| Perform smoothing filtering processing on the V-Q curve, and differentiate voltage data to obtain a charging voltage difference curve | S23 |

| Search a specific range for a maximum value point of the charging voltage difference curve, and determine whether the point is a maximal value point of the charging voltage difference curve | S24 |

| If the point is the maximal value point, acquire a peak voltage of the maximal value point, and determine whether the peak voltage satisfies $V<V_{TL}$ or $V>V_{Th}$ | S25 |

| If $V<V_{TL}$, indicate that the target knee point is a low-voltage platform knee point; if $V>V_{Th}$, indicate that the target knee point is a high-voltage platform knee point; and if the peak voltage does not satisfy the two relationships, continue to charge the cell until it is fully charged | S26 |

| Acquire a charged electricity of the cell from the target knee point to the completion of charging after the cell is fully charged | S27 |

| Calculate the total capacity of the cell according to the knee-point electricity and the charged electricity so as to obtain the capacity of the cell | S28 |

FIG. 3

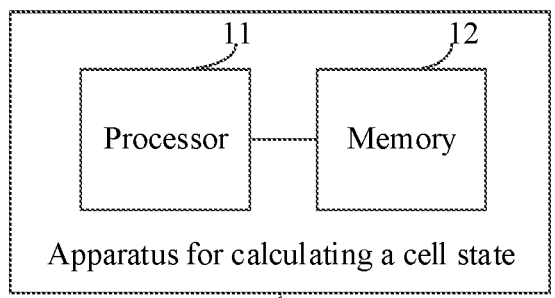

FIG. 4

METHOD AND APPARATUS FOR CALCULATING CELL STATE, AND STORAGE MEDIUM

CROSS-REFERENCE TO RELATED APPLICATIONS

The present application is a continuation application of PCT application No. PCT/CN2021/102821 filed on Jun. 28, 2021, which claims priority to and benefits of Chinese Patent Application No. 202010617231.2, filed on Jun. 30, 2020, and entitled "Method and Apparatus for Calculating Cell State, and Storage Medium". The entire content of all of the above-referenced applications is incorporated herein by reference.

FIELD

The present disclosure relates to the technical field of vehicles, and more specifically, to a method and apparatus for calculating a cell state, and a computer storage medium.

BACKGROUND

With the rapid development of a battery technology, lithium-ion cells are widely used in the fields such as electric automobiles, and energy storage power stations.

The aging degree of a cell can be expressed by a state of health (SOH). The SOH can be defined by the remaining capacity, the internal resistance, and the number of cycles. The most commonly used way to define the aging degree is the remaining capacity. The remaining capacity is mainly calculated, according to a total electricity in the charging or discharging stage, by fully charging or fully discharging a cell, or a cell is charged or discharged in a certain state of charge (SOC) range to calculate a total cell capacity according to a charged or discharged electricity and the corresponding SOC range.

However, the cell will gradually age in the continuous charging and discharging cycle, and the performance will gradually decrease. For example, the cell capacity decreases, the internal resistance increases, and the power decreases. Furthermore, full charge or full discharge of the cell not only affects the life of the cell itself, but also causes safety problems. Charge or discharge in the specific SOC range requires that the selected range needs to be large enough, and has a high requirement for the accuracy of the SOC. Inaccurate estimation of the SOC can easily lead to large errors in results.

SUMMARY

The present disclosure provides a method and apparatus for calculating a cell state, and a storage medium, so as to quickly calculate the cell capacity and improve the accuracy of the calculation of the cell capacity.

In a first aspect, the present disclosure provides a method for calculating a cell state. The method includes: acquiring a first knee-point voltage threshold of a cell, a first knee-point electricity corresponding to the first knee-point voltage threshold, a second knee-point voltage threshold of the cell, and a second knee-point electricity corresponding to the second knee-point voltage threshold; recording a first charging curve of the cell in real time; obtaining a target knee point according to the first charging curve, the first knee-point voltage threshold, and the second knee-point voltage threshold, and obtaining a target-knee-point electricity according to the first knee-point electricity or the second knee-point electricity; detecting the electricity of the cell until the charging is completed, and obtaining a charged electricity of the cell from the target knee point to the completion of charging; and obtaining the capacity of the cell according to the target-knee-point electricity and the charged electricity.

According to the method for calculating a cell state of the embodiments of the present disclosure, the target knee point and the corresponding knee-point electricity are obtained according to the first charging curve, the first knee-point voltage threshold, the first knee-point electricity corresponding to the first knee-point voltage threshold, the second knee-point voltage threshold and the second knee-point electricity corresponding to the second knee-point voltage threshold. The charged electricity from the target knee point to the completion of charging is obtained when it is detected that the cell is fully charged, that is, the charging is completed. The capacity of the cell is obtained according to the knee-point electricity and the charged electricity. That is, the method of the embodiments of the present disclosure can accurately calculate the cell state at any initial state before the target knee point, without deeply discharging the cell before charging, so that the loss of the cell caused by the full charge or full discharge is avoided, and the life and charging safety of the cell are improved. Furthermore, during the calculation of the knee-point electricity and the charged electricity at the completion of charging, the capacity of the cell can be quickly calculated only by detecting the charged quantities of electric charges at the target knee point and the end of the charging, without selecting an SOC range. Compared with a method for calculating the total capacity of a cell by selecting a specific SOC range for charging or discharging, the method of the embodiments of the present disclosure can avoid an error in the calculation of the cell state due to inaccurate estimation of the SOC, and improves the accuracy of cell capacity calculation.

In a second aspect, the present disclosure provides a computer-readable storage medium, with a computer program stored thereon. When executed, the computer program implements the above method for calculating a cell state.

In a third aspect, the present disclosure provides an apparatus for calculating a cell state. The apparatus includes at least one processor; and a memory in communication connection with the at least one processor. The memory stores instructions which are processable by the at least one processor and implement, when processed by the at least one processor, the above method for calculating a cell state.

According to the apparatus for calculating a cell state provided in the present disclosure, the processor is used for implementing the method for calculating a cell state, and to obtain, when it is detected that the cell is fully charged, that is, when the charging is completed, the charged electricity from the target knee point to the completion of charging. That is, the cell does not need to be fully charged or fully discharged since the knee-point electricity and the charged electricity are obtained. The cell state can be precisely calculated at any initial state lower than the target knee point, so that the loss of the cell caused by the full charge or full discharge is avoided, and the charging safety is improved. Compared with a method for calculating the total electricity of a cell by selecting a specific SOC range for charging or discharging, the apparatus of the embodiments of the present disclosure can avoid an error in the calculation of the cell state due to inaccurate estimation of the SOC, and improves the accuracy of cell capacity calculation.

BRIEF DESCRIPTION OF THE DRAWINGS

The foregoing and/or additional aspects and advantages of the present invention will become apparent and comprehensible in the description of the embodiments made with reference to the following accompanying drawings.

FIG. 3 is a flowchart of a method for calculating a cell state according to one embodiment of the present disclosure; and FIG. 4 is a block diagram of an apparatus for calculating a cell state according to one embodiment of the present disclosure.

DETAILED DESCRIPTION

To make the objectives, technical solutions, and advantages of the present disclosure more apparent and clearer, the following describes certain embodiments of the present disclosure in further detail with reference to the accompanying drawings. It should be understood that specific embodiments described therein are merely used for explaining the present disclosure instead of limiting the present disclosure.

Figure 1:
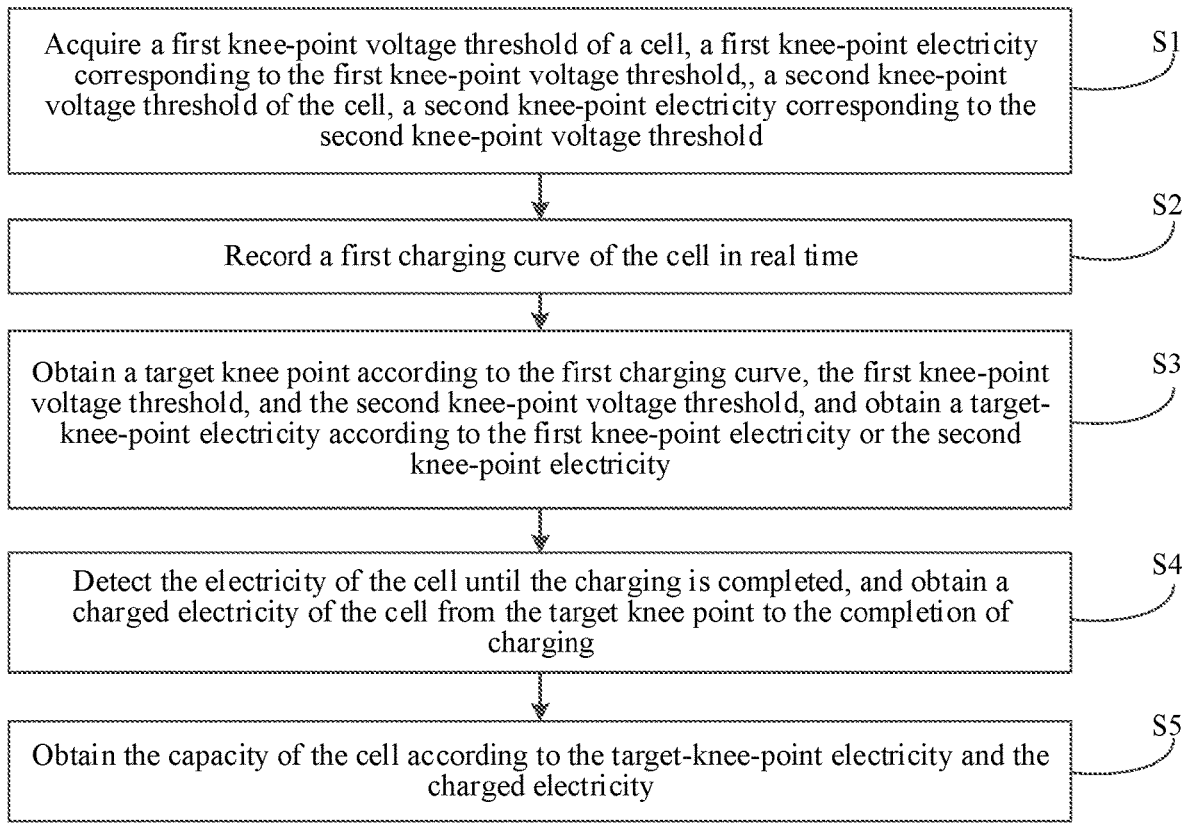
FIG. 1 is a flowchart of a method for calculating a cell state according to one embodiment of the present disclosure.
Figure 2:
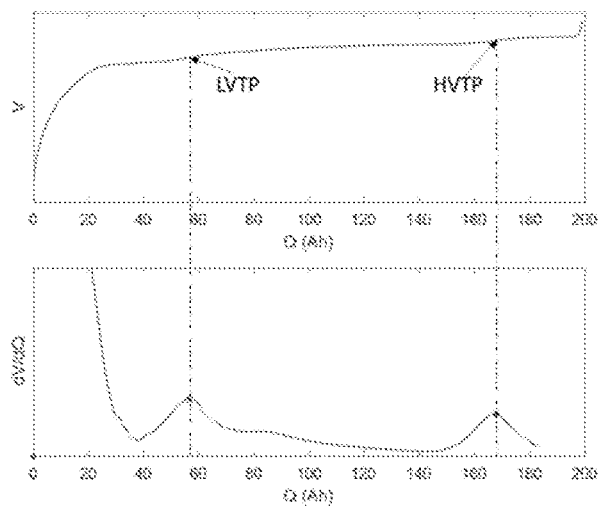
FIG. 2 is a schematic diagram of comparison between a first charging curve and a charging voltage difference curve according to one embodiment of the present disclosure.

Referring to FIG. 1 to FIG. 3 below, a method for calculating a cell state according to an embodiment of the first aspect of the present disclosure is described. As shown in FIG. 1, the method for calculating a cell state according to an embodiment of the present disclosure includes at least step S1 to step S5. A specific process of each step is as follows:

Step S1, a first knee-point voltage threshold of a cell, a first knee-point electricity corresponding to the first knee-point voltage threshold, a second knee-point voltage threshold of the cell and a second knee-point electricity corresponding to the first knee-point voltage threshold are acquired.

A voltage-electricity characteristic curve of the cell will overall translate towards a low-capacity direction as a cell, such as a lithium ion cell, ages, but in the translation process, a knee-point electricity corresponding to a knee point of a voltage platform basically remains unchanged, and a voltage threshold corresponding to the knee point of the voltage platform will not change with the translation of the characteristic curve. Therefore, the method according to the embodiment of the present disclosure acquires the first knee-point voltage threshold of the cell, the first knee-point electricity corresponding to the first knee-point voltage threshold, the second knee-point voltage threshold of the cell and the second knee-point electricity corresponding to the first knee-point voltage threshold by means of detecting the voltage-electricity characteristic curve of the cell in a charging process of the cell.

Step S2, a first charging curve of the cell is recorded in real time.

In one embodiment, when a cell in an unknown state starts to be charged, first capacity data and corresponding first voltage data in the charging process of the cell, and a voltage-electricity characteristic curve, i.e., the first charging curve, which is established according to the first capacity data and the first voltage data are recorded in real time.

Step S3, a target knee point is obtained according to the first charging curve, the first knee-point voltage threshold, and the second knee-point voltage threshold, and a target-knee-point electricity is obtained according to the first knee-point electricity or the second knee-point electricity.

In the method according to the embodiments of the present disclosure, by means of detecting the first charging curve in the charging process of the cell in real time, the characteristic of this curve is analyzed to search feature points of the curve. The capacity of the cell is calculated according to the feature points of the curve. That is, in one embodiment of the present disclosure, the target knee point is used as the feature point of the curve to calculate the capacity of the cell, so that the capacity of the cell can be calculated in a case that an initial SOC state of the cell is unknown, without involving SOC-related variables. An error caused by inaccurate SOC calculation is avoided, and the accuracy is improved. Furthermore, by the method according to one embodiment of the present disclosure, the cell state can be accurately calculated in any initial state where the target knee point (about less than 70% of the SOC) can be detected. It is not necessary to deeply discharge the cell before charging, so that the loss of the cell itself caused by full charge or full discharge is avoided, and the life and charging safety of the cell are improved.

In one embodiment, for a knee point of the first charging curve, whether the knee point of the first charging curve is the target knee point is determined according to the first knee-point voltage threshold and the second knee-point voltage threshold. The target-knee-point electricity can be obtained according to the first knee-point electricity or the second knee-point electricity after the target knee point is determined. For example, as shown in FIG. 2, the first charging curve has two target knee points with different voltage values. The target knee point with the higher voltage is on a high-SOC section, and the electricity of this target knee point is $Q_{HVTP}$. The target knee point with the lower voltage is on a low-SOC section, and the electricity of this target knee point is $Q_{LVTP}$.

Step S4, the electricity of the cell is detected until the charging is completed, and a charged electricity of the cell from the target knee point to the completion of charging is obtained. The completion of charging means that the cell is in a fully charged state.

In one embodiment, when it is detected that the electricity of the cell reaches an electricity of full charge, the charged electricity from the target knee point to the completion of charging of the cell is used as the charged electricity of the cell.

Step S5, the capacity of the cell is obtained according to the knee-point electricity and the charged electricity.

In one embodiment, the sum of the knee-point electricity and the charged electricity can be used as the capacity of the cell. The cell state can be determined according to the capacity of the cell. The capacity of the cell can be understood as the total electricity of the current cell state.

For example, the capacity of the cell is denoted as Q. If there is only one target knee point, $Q=Q_{HVTP}+Q_{HVP}$. If there are two target knee points, the target knee point with the lower voltage is selected for calculation, $Q=Q_{LVTP}+Q_{LVP}$, where $Q_{HVP}$ and $Q_{LVP}$ respectively represent the charged quantities of electric charges after the two target knee points. Referring to FIG. 2, for a power cell of an electric vehicle, its SOC at the beginning of charging is unknown. If charging begins at the lower SOC section, two target knee points HVTP and LVTP can be detected in the charging process. The charged electricity after the target knee point LVTP with the lower voltage is larger than the charged electricity after the target knee point HVTP with the higher voltage, so that the electricity $Q_{LVTP}$ corresponding to the target knee point LVTP with the lower voltage and the charged electricity $Q_{LVP}$ after the target knee point LVTP with the lower voltage are selected for calculation to obtain the total capacity of the cell Q, i.e. $Q=Q_{LVTP}+Q_{LVP}$.

If the charging begins at the middle SOC section, i.e. between the target knee point HVTP with the higher voltage and the target knee point LVTP with the lower voltage, only the target knee point HVTP with the higher voltage can be detected in the charging process. The total capacity of the cell Q, i.e. $Q=Q_{HVTP}+Q_{HVP}$, is obtained by calculation according to the electricity $Q_{HVTP}$ corresponding to the target knee point HVTP with the higher voltage and the charged electricity $Q_{HVP}$ after the target knee point HVTP with the higher voltage. It is not necessary to determine an initial value of the SOC in both of the above cases.

The method for calculating a cell state according to one embodiment of the present disclosure can accurately calculate the cell state without deeply discharging the cell before charging, so that the loss of the cell itself caused by full charge or full discharge is avoided, and the life of the cell is prolonged. Furthermore, during the calculation of the knee-point electricity and the charged electricity at the completion of charging, only the charged quantities of electric charges at the target knee point and the end of the charging are detected, without selecting an SOC range. Compared with a method for calculating the total electricity of a cell by selecting a specific SOC range for charging or discharging, the method for calculating a cell state of the embodiments of the present disclosure can avoid an error in the calculation of the cell capacity due to inaccurate estimation of the SOC, and improves the accuracy of cell capacity calculation. A cell for an electric vehicle needs to be replaced if its capacity attenuation is greater than 20%. That is, the HVTP on the higher SOC section can be detected in the cell used by the electric vehicle, so that the capacity of the cell is obtained according to the present disclosure.

In some embodiments, a first knee-point voltage threshold of a cell, a first knee-point electricity corresponding to the first knee-point voltage threshold, a second knee-point voltage threshold of the cell and a second knee-point electricity corresponding to the first knee-point voltage threshold are acquired, including the following: A second charging curve of the cell is acquired. A first knee point and a second knee point are determined according to the second charging curve. The first knee-point voltage threshold and first knee-point electricity corresponding to the first knee point, and the second knee-point voltage threshold and second knee-point electricity corresponding to the second knee point are acquired.

In one embodiment, in the voltage-electricity characteristic curves of cells of the same specification in the same batch, the quantities of electric charges $Q_{HVTP}$, $Q_{LVTP}$, corresponding to the target knee points with the high or low voltages, as well as the voltage thresholds $V_{Th}$, $V_{Tl}$, corresponding to a platform area are all known, so that values of these characteristic quantities can be determined only according to the voltage-electricity characteristic curves of some of the cells. That is, at a cell testing stage, some of the cells of the same specification in the same batch can be taken as reference cells for constant-current charging after the reference cells are fully discharged. Second voltage data and second capacity data in the charging process of the reference cells are recorded. The second charging curve of the cell is obtained according to the second voltage data and the second capacity data in the charging process of some reference batteries. By means of analyzing the curve characteristics of the second charging curve, the first knee-point voltage threshold corresponding to the first knee-point HVTP is determined, which is denoted as $V_{Th}$, and the second knee-point voltage threshold corresponding to the second knee-point LVTP is determined, which is denoted as $V_{Tl}$. The first knee-point voltage threshold $V_{Th}$ corresponds to the first knee-point electricity $Q_{HVTP}$, and the second knee-point voltage threshold $V_{Tl}$ corresponds to the second knee-point electricity $Q_{LVTP}$. The second charging curve, as well as the corresponding knee-point voltage thresholds and knee-point quantities of electric charges, can be pre-stored.

In some embodiments, a target knee point and a target-knee-point electricity are obtained, including the following: A voltage difference curve of the first charging curve is acquired. A peak voltage corresponding a maximal value of the voltage difference curve is acquired. The target knee point is determined by comparing the first knee-point voltage threshold $V_{Th}$ and the second knee-point voltage threshold $V_{Tl}$ with the peak voltage, and the target-knee-point electricity is obtained according to the first knee-point electricity QHVTP or the second knee-point electricity QLVTP.

In one embodiment, the voltage difference curve of the first charging curve is acquired, including the following: Smoothing filtering processing is performed on the first charging curve, and first derivation is performed on the first voltage data with respect to the first electricity data to obtain a change rate of the first voltage data with respect to the first electricity data. The voltage difference curve of the first charging curve is built according to the change rate and the first electricity data.

More specifically, the target knee point is determined by comparing the first knee-point voltage threshold $V_{Th}$ and the second knee-point voltage threshold $V_{Tl}$ with the peak voltage respectively and the target-knee-point electricity is obtained according to the first knee-point electricity QHVTP or the second knee-point electricity QLVTP including the following: If the peak voltage is greater than the first knee-point voltage threshold $V_{Th}$, the maximal value is the target knee point, and the target-knee-point electricity is the first knee-point electricity QHVTP; or, if the peak voltage is less than the second knee-point voltage threshold $V_{Tl}$, the maximal value is the target knee point, and the target-knee-point electricity is the second knee-point electricity QLVTP. If the peak voltage and the first knee-point voltage threshold $V_{Th}$ or the second knee-point voltage threshold $V_{Tl}$ do not satisfy the above two relationships, a next peak voltage continues to be searched and compared with the first knee-point voltage threshold $V_{Th}$ or the second knee-point voltage threshold $V_{Tl}$. For example, as shown in FIG. 2, a diagram of a typical cell charging curve and voltage difference curve is illustrated. The first knee point HVTP and the second knee point LVTP can be determined according to the voltage difference curve in combination with the first knee-point voltage threshold $V_{Th}$ and the second knee-point voltage threshold $V_{Tl}$. A maximum value point is selected within a range of the voltage difference curve. Whether this point is a maximal value point of the voltage difference curve is determined. If this point is not the maximal value point, the cell continues to be charged, and a maximal value point of the curve is searched by recording the first voltage data and the first electricity data in the charging process in real time. If this point is the maximal value point, a peak voltage corresponding to the maximal value point of the voltage difference curve is acquired according to the maximal value point. The peak voltage is compared with the first knee-point voltage threshold $V_{Th}$ in the second charging curve. If the peak voltage is greater than the first knee-point voltage threshold $V_{Th}$, it indicates that the peak voltage is the target knee point, and the target-knee-point electricity is the first knee-point electricity $Q_{HVTP}$. The peak voltage is compared with the second knee-point voltage threshold in the second charging curve. If the peak voltage is greater than the second knee-point voltage threshold $V_{Tl}$, it indicates that the peak voltage is the target knee point, and the target-knee-point electricity is the second knee-point electricity $Q_{LVTP}$. If the peak voltage is not greater than the first knee-point voltage threshold $V_{Th}$ and not less than the second knee-point voltage threshold $V_{Tl}$, the cell continues to be charged to search a target knee point. Therefore, in one embodiment of the present disclosure, by means of adding a voltage limiting condition, whether the detected target knee point is the first knee point or the second knee point can be determined, and a misjudgment caused by abnormal intermediate interval data in a special case can also be filtered out, so that the accuracy of calculation of a State of Health (SOH) of the cell is improved.

In one embodiment, for acquiring the second charging curve of the cell, the method of one embodiment of the present disclosure may include the following: At least one reference cell is obtained, and the constant-current charging is performed on the reference voltage after the reference voltage is controlled to be fully discharged. The second voltage data and the second electricity data in the charging process of the reference cell are recorded. The second charging curve is obtained according to the second voltage data and the electricity data in the charging process of the reference cell. For example, at least one of multiple cells of the same specification in the same batch can be selected, and the cell is charged at constant current to a fully charged state after being fully discharged. A voltage-electricity (V-Q) curve in the charging process of the cell is recorded as the second charging curve, so that the first knee-point quantities of electric charges $Q_{HVTP}$, the first knee-point voltage thresholds $V_{Th}$, the second knee-point quantities of electric charges $Q_{LVTP}$, and the second knee-point voltage thresholds $V_{Tl}$ of all the cells of the same specification in the same batch are determined by analyzing the characteristics of the second charging curve.

The quantities of electric charges $Q_{HVTP}$, $Q_{LVTP}$ corresponding to the knee points of low and high-voltage platforms of cells of a known batch, and the threshold voltages $V_{Th}$, $V_{Tl}$ corresponding to the platform area are all known, so that values of these characteristic quantities can be known only by virtue of some battery core characteristic curves. Therefore, the reference cell in one embodiment of the present disclosure may be the cell to be tested itself, or may be one or several cells extracted from the same batch as the cell to be tested.

In one embodiment, the method of one embodiment of the present disclosure further includes: An SOH of the cell is acquired according to the capacity of the cell and an initial capacity of the cell. That is, the SOH of the cell is calculated according to the obtained capacity of the cell, SOH=Q/$Q_{new}$*100%, thus determining the state of the cell according to an SOH value of the cell, where $Q_{new}$ is an initial electricity of the cell.

The method for calculating a cell state according to one embodiment of the present disclosure is exemplified in combination with FIG. 3. As shown in FIG. 3, a flowchart of a method for calculating a cell state according to an embodiment of the present disclosure is illustrated.

Step S21: Some of cells of the same specification are selected. The cells are charged at constant current to a fully charged state after being fully discharged. A V-Q curve in the charging process is recorded as the second charging curve. The first knee-point quantities of electric charges $Q_{HVTP}$, the first knee-point voltage thresholds $V_{Th}$, the second knee-point quantities of electric charges $Q_{LVTP}$, and the second knee-point voltage thresholds VTU are determined by analyzing the characteristics of the second charging curve.

Step S22: A cell with an unknown state starts to be charged, and the V-Q curve in the charging process of the cell is recorded in real time.

Step S23: Smoothing filtering processing is performed on the V-Q curve, and voltage data is differentiated to obtain a charging voltage difference curve.

Step S24: A specific range is searched for a maximum value point of the charging voltage difference curve, and whether the point is a maximal value point of the charging voltage difference curve is determined.

Step S25: If the point is the maximal value point, a peak voltage of the maximal value point is acquired, and whether the peak voltage satisfies $V<V_{Tl}$ or $V>V_{Th}$ is determined.

Step S26: If the peak voltage satisfies $V<V_{Tl}$, the target knee point is a low-voltage platform knee point. If $V>V_{Th}$, the target knee point is a high-voltage platform knee point. If the peak voltage does not satisfy the two relationships, the cell continues to be charged until it is fully charged, and the capacity of the cell is read.

Step S27: A charged electricity of the cell from the target knee point to the completion of charging is acquired after the cell is fully charged.

Step S28: The capacity of the cell is obtained according to the knee-point electricity and the charged electricity.

In a word, according to the method for calculating a cell state of one embodiment of the present disclosure, the target knee point and the corresponding knee-point electricity are obtained through the first charging curve and the charging voltage difference curve, and the charged electricity from the target knee point to the target electricity is obtained when it is detected that the electricity of the cell reaches the target electricity. That is, during the obtaining of the knee-point electricity and the charged electricity, it is not necessary to fully charge or fully discharge the cell, so as to avoid the loss of the cell itself caused by the full charge or full discharge and improve the charging safety. Furthermore, during the calculation of the knee-point electricity and the charged electricity, only the charged quantities of electric charges at the target knee point and the end of charging need to be detected, without selecting an SOC range. Compared with the method for calculating the total electricity of the cell by selecting a specific SOC range for charging or discharging, the method can avoid an error, caused by inaccurate SOC estimation, in SOH calculation, and improves the accuracy of cell capacity calculation. By means of adding a voltage limiting condition, whether the detected target knee point is a high-level knee point or a low-level knee point can be determined, and a misjudgment caused by abnormal intermediate interval data in a special case can be filtered out.

A computer-readable storage medium according to an embodiment of a second aspect of the present disclosure is provided with a computer program stored thereon. When executed, the computer program implements the method for calculating a cell state in the above embodiment.

An apparatus for calculating a cell state according to one embodiment of a third aspect of the present disclosure is described below with reference to the drawing.

FIG. 4 is a block diagram of an apparatus for calculating a cell state according to one embodiment of the present disclosure. As shown in FIG. 4, the apparatus 10 for calculating a cell state includes a processor 11 and a memory 12.

The memory 12 which is in communication connection with the at least one processor 11 stores instructions which are processable by the at least one processor 11 and implement, when processed by the at least one processor 11, the method for calculating a cell state in the above embodiment.

According to the apparatus 10 for calculating a cell state of one embodiment of the present disclosure, the processor 11 is used for implementing the method for calculating a cell state. The target knee point is obtained through the first charging curve and the charging voltage difference curve, and the charged electricity is obtained when the electricity of the cell reaches the target electricity. That is, during the obtaining of the knee-point electricity and the charged electricity, it is not necessary to fully charge or fully discharge the cell, so as to avoid the loss of the cell itself caused by the full charge or full discharge and improve the charging safety. Furthermore, only the charged quantities of electric charges at the target knee point and the end of charging need to be detected, without selecting an SOC range. Compared with the method for calculating the total electricity of the cell by selecting a specific SOC range for charging or discharging, the present disclosure can avoid an error, caused by inaccurate SOC estimation, in SOH calculation, and improves the accuracy of SOH calculation.

In the descriptions of this specification, descriptions using reference terms "an embodiment", "some embodiments", "an exemplary embodiment", "an example", "a specific example", or "some examples" mean that specific characteristics, structures, materials, or features described with reference to the embodiment or example are included in at least one embodiment or example of the present disclosure. In this specification, schematic descriptions of the foregoing terms are not necessarily directed at a same embodiment or example.

Although embodiments of the present disclosure have been shown and described, a person of ordinary skill in the art should understand that various changes, modifications, replacements and variations may be made to the embodiments without departing from the principles and spirit of this application, and the scope of the present disclosure is as defined by the appended claims and their equivalents.

What is claimed is:

1. A method for calculating a cell state of a cell during a charging process of the cell, comprising:
    acquiring a first knee-point voltage threshold of the cell, a first knee-point electricity corresponding to the first knee-point voltage threshold, a second knee-point voltage threshold of the cell, and a second knee-point electricity corresponding to the second knee-point voltage threshold;
    recording a first charging curve of the cell in real time;
    determining a target knee point according to the first charging curve, the first knee-point voltage threshold, and the second knee-point voltage threshold, and determining a target-knee-point electricity according to the first knee-point electricity or the second knee-point electricity;
    detecting electricity of the cell until the charging process is completed, and determining a charged electricity of the cell from the target knee point to completion of the charging process;
    determining a capacity of the cell according to the target-knee-point electricity and the charged electricity, without selecting a state of charge (SOC) range; and
    determining a state of health (SOH) of the cell according to the capacity of the cell.

2. The method for calculating a cell state according to claim 1, wherein the recording the first charging curve of the cell in real time comprises:
    controlling and charging the cell;
    recording first electricity data and corresponding first voltage data in the charging process of the cell in real time; and
    building the first charging curve according to the first electricity data and the first voltage data.

3. The method for calculating a cell state according to claim 2, wherein the obtaining the target knee point according to the first charging curve, the first knee-point voltage threshold, and the second knee-point voltage threshold, and obtaining the target-knee-point electricity according to the first knee-point electricity or the second knee-point electricity comprises:
    acquiring a voltage difference curve of the first charging curve;
    acquiring a peak voltage corresponding to a maximal value of the voltage difference curve; and
    determining the target knee point by comparing the first knee-point voltage threshold and the second knee-point voltage threshold with the peak voltage respectively, and obtaining the target-knee-point electricity according to the first knee-point electricity or the second knee-point electricity.

4. The method for calculating a cell state according to claim 3, wherein the acquiring the voltage difference curve of the first charging curve comprises:
    performing smoothing filtering processing on the first charging curve, and performing first derivation on the first voltage data with respect to the first electricity data to obtain a change rate of the first voltage data with respect to the first electricity data; and building the voltage difference curve of the first charging curve according to the change rate and the first electricity data.

5. The method for calculating a cell state according to claim 3, wherein determining the target knee point by comparing the first knee-point voltage threshold and the second knee-point voltage threshold with the peak voltage respectively, and obtaining the target-knee-point electricity according to the first knee-point electricity or the second knee-point electricity comprises:
    if the peak voltage is greater than the first knee-point voltage threshold, the maximal value is the target knee point, and the target-knee-point electricity is the first knee-point electricity; or,
    if the peak voltage is less than the second knee-point voltage threshold, indicating that the maximal value is the target knee point, and the target-knee-point electricity is the second knee-point electricity.

6. The method for calculating a cell state according to claim 1, wherein the acquiring the first knee-point voltage threshold of the cell, the first knee-point electricity corresponding to the first knee-point voltage threshold, the second knee-point voltage threshold of the cell and the second knee-point electricity corresponding to the second knee-point voltage threshold comprises:
- acquiring a second charging curve of the cell;
- determining a first knee point and a second knee point according to the second charging curve; and
- acquiring the first knee-point voltage threshold and the first knee-point electricity corresponding to the first knee point, and the second knee-point voltage threshold and the second knee-point electricity corresponding to the second knee point.

7. The method for calculating a cell state according to claim 6, wherein the acquiring the second charging curve of the cell comprises:
- obtaining a reference cell, and performing a constant-current charging process on the reference cell after the reference cell is controlled to be fully discharged;
- recording second voltage data and second electricity data in the constant-current charging process of the reference cell until the constant-current charging process is completed; and
- obtaining the second charging curve according to the second voltage data and the second electricity data in the constant-current charging process of the reference cell.

8. The method for calculating a cell state according to claim 1, wherein the determining a state of health (SOH) of the cell according to the capacity of the cell further comprises:
- acquiring an initial capacity of the cell; and
- acquiring the state of health (SOH) of the cell according to the capacity of the cell and the initial capacity of the cell.

9. A non-transitory computer storage medium storing a computer program for, when executed, performing a method for calculating a cell state of a cell during a charging process of the cell, the method comprising:
- acquiring a first knee-point voltage threshold of the cell, a first knee-point electricity corresponding to the first knee-point voltage threshold, a second knee-point voltage threshold of the cell, and a second knee-point electricity corresponding to the second knee-point voltage threshold;
- recording a first charging curve of the cell in real time;
- determining a target knee point according to the first charging curve, the first knee-point voltage threshold, and the second knee-point voltage threshold, and determining a target-knee-point electricity according to the first knee-point electricity or the second knee-point electricity;
- detecting electricity of the cell until the charging process is completed, and determining a charged electricity of the cell from the target knee point to completion of the charging process;
- determining a capacity of the cell according to the target-knee-point electricity and the charged electricity, without selecting a state of charge (SOC) range; and
- determining a state of health (SOH) of the cell according to the capacity of the cell.

10. The non-transitory computer storage medium according to claim 9, wherein the recording the first charging curve of the cell in real time comprises:
- controlling and charging the cell;
- recording first electricity data and corresponding first voltage data in the charging process of the cell in real time; and
- building the first charging curve according to the first electricity data and the first voltage data.

11. The non-transitory computer storage medium according to claim 10, wherein the obtaining the target knee point according to the first charging curve, the first knee-point voltage threshold, and the second knee-point voltage threshold, and obtaining the target-knee-point electricity according to the first knee-point electricity or the second knee-point electricity comprises:
- acquiring a voltage difference curve of the first charging curve;
- acquiring a peak voltage corresponding to a maximal value of the voltage difference curve; and
- determining the target knee point by comparing the first knee-point voltage threshold and the second knee-point voltage threshold with the peak voltage respectively, and obtaining the target-knee-point electricity according to the first knee-point electricity or the second knee-point electricity.

12. The non-transitory computer storage medium according to claim 11, wherein the acquiring the voltage difference curve of the first charging curve comprises:
- performing smoothing filtering processing on the first charging curve, and performing first derivation on the first voltage data with respect to the first electricity data to obtain a change rate of the first voltage data with respect to the first electricity data; and building the voltage difference curve of the first charging curve according to the change rate and the first electricity data.

13. The non-transitory computer storage medium according to claim 11, wherein determining the target knee point by comparing the first knee-point voltage threshold and the second knee-point voltage threshold with the peak voltage respectively, and obtaining the target-knee-point electricity according to the first knee-point electricity or the second knee-point electricity comprises:
- if the peak voltage is greater than the first knee-point voltage threshold, the maximal value is the target knee point, and the target-knee-point electricity is the first knee-point electricity; or,
- if the peak voltage is less than the second knee-point voltage threshold, indicating that the maximal value is the target knee point, and the target-knee-point electricity is the second knee-point electricity.

14. The non-transitory computer storage medium according to claim 9, wherein the acquiring the first knee-point voltage threshold of the cell, the first knee-point electricity corresponding to the first knee-point voltage threshold, the second knee-point voltage threshold of the cell and the second knee-point electricity corresponding to the second knee-point voltage threshold comprises:
- acquiring a second charging curve of the cell;
- determining a first knee point and a second knee point according to the second charging curve; and
- acquiring the first knee-point voltage threshold and the first knee-point electricity corresponding to the first knee point, and the second knee-point voltage threshold and the second knee-point electricity corresponding to the second knee point.

15. The non-transitory computer storage medium according to claim 14, wherein the acquiring the second charging curve of the cell comprises:
- obtaining a reference cell, and performing a constant-current charging process on the reference cell after the reference cell is controlled to be fully discharged;

recording second voltage data and second electricity data in the constant-current charging process of the reference cell until the constant-current charging process is completed; and obtaining the second charging curve according to the second voltage data and the second electricity data in the constant-current charging process of the reference cell.

16. The non-transitory computer storage medium according to claim 9, wherein the determining a state of health (SOH) of the cell according to the capacity of the cell further comprises:

acquiring an initial capacity of the cell; and acquiring the state of health (SOH) of the cell according to the capacity of the cell and the initial capacity of the cell.

17. An apparatus for calculating a cell state of a cell during a charging process of the cell, comprising:

at least one processor; and a memory in communication connection with the at least one processor, wherein the memory stores instructions processable by the at least one processor to perform:

acquiring a first knee-point voltage threshold of the cell, a first knee-point electricity corresponding to the first knee-point voltage threshold, a second knee-point voltage threshold of the cell, and a second knee-point electricity corresponding to the second knee-point voltage threshold;

recording a first charging curve of the cell in real time;

determining a target knee point according to the first charging curve, the first knee-point voltage threshold, and the second knee-point voltage threshold, and determining a target-knee-point electricity according to the first knee-point electricity or the second knee-point electricity;

detecting electricity of the cell until the charging process is completed, and determining a charged electricity of the cell from the target knee point to completion of the charging process;

determining a capacity of the cell according to the target-knee-point electricity and the charged electricity, without selecting a state of charge (SOC) range; and determining a state of health (SOH) of the cell according to the capacity of the cell.

18. The apparatus for calculating a cell state according to claim 17, wherein the recording the first charging curve of the cell in real time comprises:

controlling and charging the cell;

recording first electricity data and corresponding first voltage data in the charging process of the cell in real time; and building the first charging curve according to the first electricity data and the first voltage data.

19. The apparatus for calculating a cell state according to claim 18, wherein the obtaining the target knee point according to the first charging curve, the first knee-point voltage threshold, and the second knee-point voltage threshold, and obtaining the target-knee-point electricity according to the first knee-point electricity or the second knee-point electricity comprises:

acquiring a voltage difference curve of the first charging curve;

acquiring a peak voltage corresponding to a maximal value of the voltage difference curve; and determining the target knee point by comparing the first knee-point voltage threshold and the second knee-point voltage threshold with the peak voltage respectively, and obtaining the target-knee-point electricity according to the first knee-point electricity or the second knee-point electricity.

20. The apparatus for calculating a cell state according to claim 19, wherein the acquiring the voltage difference curve of the first charging curve comprises:

performing smoothing filtering processing on the first charging curve, and performing first derivation on the first voltage data with respect to the first electricity data to obtain a change rate of the first voltage data with respect to the first electricity data; and building the voltage difference curve of the first charging curve according to the change rate and the first electricity data.

* * * * *